June 5, 1928. 1,672,078
T. NEGLER
CHAIN FASTENER
Filed April 21, 1927
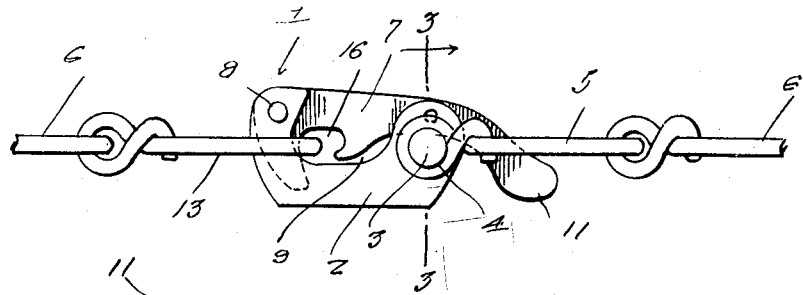
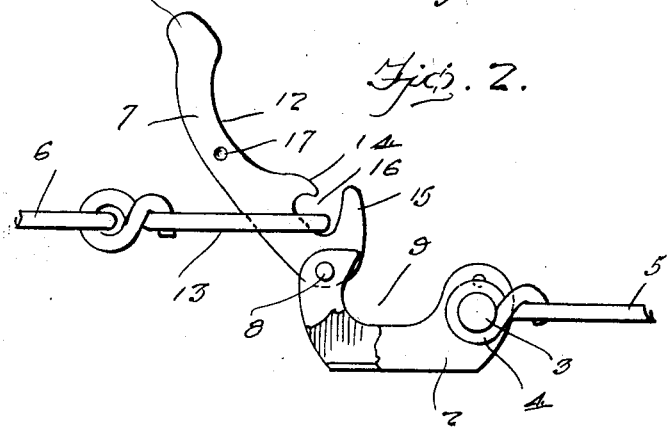
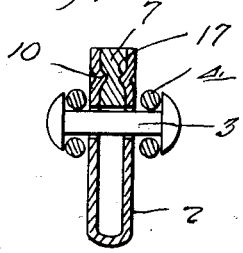
Inventor
Theophil Negler
By Clarence A. O'Brien
Attorney Patented June 5, 1928.

1,672,078

UNITED STATES PATENT OFFICE.

THEOPHIL NEGLER, OF MILWAUKEE, WISCONSIN.

CHAIN FASTENER.

Application filed April 21, 1927. Serial No. 185,590.

The present invention relates to improvements in fastening devices, and has reference more particularly to a means for connecting the end links of a chain.

One of the important objects of the present invention is to provide a chain fastener, which is of such construction, as to be readily and easily operable in connecting the ends of a chain together, and which device will further take up slack, which may occur in the chain.

Another important object of the invention is to provide a chain fastener of the above mentioned character, which is of such construction as to prevent the locking lever of the fastener becoming accidentally disengaged from its locking position, the locking lever being further of such construction as to permit the same to be readily and easily actuated for either opening or closing the fastener.

A further object is to provide a chain fastener of the above mentioned character, which is simple in construction, strong and durable, and further well adapted to the purpose for which it is designed.

Other objects and advantages of the invention will become apparent during the course of the following detailed description.

In the accompanying drawing, forming a part of this application and in which like reference characters designate like parts throughout the views:

Figure 1 is a side elevation of the fastener embodying my invention showing the same in its locked position.

Figure 2 is a similar view, showing the locking lever in the act of being moved to a locking position, and Figure 3 is a vertical sectional view taken approximately on the line 3—3 of Figure 1.

In the drawing, wherein for the purpose of illustration is shown the preferred embodiment of my invention, the numeral 1 designates generally my improved chain fastener, the same comprising the channel shaped body 2 which is formed of sheet metal. The ends of the channel shaped body are slightly rounded, as clearly shown in Figures 1 and 2, as is also the upper corner of the side. A pivot forming rivet 3 extends through the intermediate portions of the sides of the channel shaped body 2, adjacent the forward end thereof and as is clearly shown in Figure 3, the rivet is of such length as to connect the looped free ends 4 of one end link 5 of a chain 6, to be disposed around the shank of the rivet between the outer faces of the respective sides and the adjacent heads of the rivet. This will provide a pivotal connection between the forward end of the channel shaped body 2 and one end link of the chain 6.

Also forming an important part of the present invention is the elongated locking lever 7, which is of a length greater than the length of the channel shaped body 2. One end of this lever is pivoted between the sides of the channel shaped body at the rear end thereof and the pivoted pin 8 provided for affording a pivotal connection between the lever 7 and the channel shaped body extends through the rear end portions of the sides of the body at a point above the pivot 3 and this is clearly shown in Figures 1 and 2.

The purpose of arranging the pivot for the lever at a point above the pivot for one of the end links of the chain is to provide a means whereby the locking lever will be maintained in a locking position even though the free end thereof should become accidentally disengaged from the forward end portion of the body.

The upper edges of the sides of the channel shaped body 2 are cut away intermediate the pivotal connections between the body and the end link 5 and the lever 7 respectively, whereby to provide an enlarged link receiving pocket 9. The sides of the cut out portion are curved as clearly shown in Figure 2. The sides of the channel shaped body are further formed with inwardly projecting protuberances at the forward upper end thereof as clearly shown at 10 with reference more particularly to Figure 3, and the purpose of this construction will be hereinafter more fully described.

The free end of the lever 7 is formed with a thumb engaging portion 11, whereby said lever may be readily and easily actuated. Furthermore, the inner edge of the lever 7 is curved as illustrated at 12 and this curvature of the lever will provide a means whereby the other end link 13 of the chain 6 may freely slide along the lever. The lever is further formed with a pair of opposed reversely curved lugs 14 and 15 respectively at its inner edge and as is clearly shown in Figure 2, the lug 15 projects beyond the outer end of the lug 14. These lugs cooperate to form a relatively small link receiving pocket 16, and the lug 14 is so curved as to permit the free end of the end link 13 to readily slide thereover, so that said link may be readily and easily disposed within the pocket 16, during the upward swinging movement of the locking lever 7 on its pivot 8.

Furthermore, the lug 15 will provide a means for preventing the displacement of the link 13 from the pocket 16.

When the free end of the link 13 is disposed over the free end of the locking lever 7 when the latter is in the position shown in Figure 2, said link, will, by gravity, slide downwardly on the lever and will enter the pocket 16. The thumb engaging portion 11 is then grasped and the lever is swung forwardly between the sides of the channel shaped body and when the lever is disposed within the body in the manner as shown in Figure 1, the end link 13 will be disposed within the link receiving pocket 9 formed in the body and the intermediate portion of the lever will form a closure for the pocket 9. Furthermore, the free end portion of the locking lever will be disposed between the forward end portions of the sides of the channel body and the inner edge of this portion of the lever will engage the pivot 3 while the thumb engaging portion projects beyond the forward end of the body and through the other end link 5.

For the purpose of further locking the lever against accidental displacement from within the body 2, the portion of the lever which is adapted for disposition between the forward end portions of the sides is provided with indentations such as are shown at 17, in the respective sides thereof and the protuberances 10 engage with these indentations in a manner as clearly shown in Figure 3.

The provision of a chain fastener of the above mentioned character will not only secure the free ends of a chain together, but will also take up any slack which may occur in the chains. Furthermore, the locking lever will permit the ends of the chain to be secured together, even though the chain may be readily short, as frequently is the case. The simplicity of my device enables the parts to be readily and easily actuated for closing or opening the fastener and when the parts are disposed in a closed position, the locking lever will not be apt to become accidentally disengaged from its locking position. Also, a chain fastener of the above mentioned character may be manufactured at a very low cost and the same will be further strong and durable.

While I have shown the preferred embodiment of my invention, it is to be understood that various changes in the size, shape and arrangement of parts may be resorted to, without departing from the spirit of the invention or the scope of the appended claim.

Having thus described my invention, what I claim as new is:

The combination with the end links of a chain, a chain fastener comprising a channel shaped body, a pivot pin extending through the sides of the body at the forward end thereof and through one of said end links, a locking lever pivoted at its inner end between the sides of the channel shaped body at the rear end thereof and at a point above the pivotal connection between the forward end of the body and the aforementioned end link, the intermediate portions of the sides of the channel shaped body being cut out to provide a relatively large link receiving pocket, the inner edge of the lever being curved, a pair of reversely curved lugs projecting from the inner edge of the lever at the pivoted inner end thereof, to provide a relatively small pocket to receive the other end link which is slidable over the free end of the lever and the slightly curved back of the lug remote from the pivoted end of the lever, the lug nearest the pivoted end of the lever being longer than the other lug and projecting beyond the free end of said last mentioned lug to prevent the displacement of the last mentioned end link from the smaller pocket, said last mentioned end link being adapted to enter the pocket formed in the channel shaped body when the lever is swung downwardly between the sides of the body, the intermediate portion of the lever forming the closure for the outer open side of the pocket formed in the body, the free end of the lever projecting beyond the forward end of the body, and cooperating means between the forward portion of the sides of the body and the adjacent portion of the lever for securing said lever against displacement from between the sides of the channel shaped body.

In testimony whereof I affix my signature.

THEOPHIL NEGLER.